United States Patent
Yamashita et al.

(10) Patent No.: US 7,347,181 B2
(45) Date of Patent: Mar. 25, 2008

(54) DIRECT INJECTION SPARK IGNITION ENGINE

(75) Inventors: Hiroyuki Yamashita, Hiroshima (JP); Masatoshi Seto, Hatsukaichi (JP); Hiroyuki Yoshida, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 11/536,013

(22) Filed: Sep. 28, 2006

(65) Prior Publication Data
US 2007/0068482 A1    Mar. 29, 2007

(30) Foreign Application Priority Data
Sep. 29, 2005  (JP)  ............................. 2005-285480

(51) Int. Cl.
*F02B 23/10* (2006.01)
*F02B 17/00* (2006.01)

(52) U.S. Cl. ............... 123/295; 123/298; 123/299; 123/301; 123/302; 123/305; 123/661

(58) Field of Classification Search ............... 123/276, 123/298, 299, 301, 302, 305, 661, 295
See application file for complete search history.

(56) References Cited

U.S. PATENT DOCUMENTS

| 6,892,695 | B2 | 5/2005 | Schmitz et al. |
| 2002/0170531 | A1* | 11/2002 | Saito et al. ............ 123/305 |
| 2005/0150478 | A1 | 7/2005 | Nomura |

FOREIGN PATENT DOCUMENTS

| DE | 102004002296 A1 | 8/2005 |
| JP | 2005-098121 A | 4/2005 |
| JP | 2005-256630 A | 9/2005 |

* cited by examiner

*Primary Examiner*—T. M Argenbright
(74) *Attorney, Agent, or Firm*—Alleman Hall McCoy Russell & Tuttle LLP

(57) ABSTRACT

A direct injection spark ignition engine comprises a cylinder, a piston, a fuel injector arranged at one side of a center axis of the cylinder for directly injecting fuel into the combustion chamber, and a smoothly continuous lowered recess formed on a top surface of the piston surface. The recess has a first cross section along a first plane including the cylinder center axis and a nozzle end of the injector. The first and second lower contours are smoothly connected with each other through a lowest point of the first cross section. The first lower contour is located at the one side of the cylinder center axis. The second lower contour is at the other side. The first contour has a larger radius than a radius of the second contour. Accordingly, the fuel spray having greater movement energy may impinge the recess at a regulated impinging angle.

20 Claims, 8 Drawing Sheets

DIRECT INJECTION SPARK IGNITION ENGINE

BACKGROUND

The present description relates to a spark ignited internal combustion engine with a fuel injector that injects fuel directly into a combustion chamber, or a so called direct injection spark ignition engine.

In recent years, to improve fuel economy and emission performance of spark ignited engines such as gasoline engines, there has been development of lean-burn engines. The lean-burn engine combusts a mixture of air and fuel with an overall air fuel ratio leaner than the stoichiometry of the fuel. The lean mixture contains greater amount of air than that of the stoichiometric air fuel mixture. Therefore, intake air is less throttled compared to a stroichiometric operation, and a pumping loss caused by the intake air throttling can be reduced to improve the fuel economy.

Generally, air fuel mixture is harder to ignite as the air fuel ratio is leaner. A conventional port injection engine injects fuel into an intake port, and the fuel is inducted with the intake air into the combustion chamber in an intake stroke of an engine cycle. When the mixture is ignited, it is homogeneous mixture in the combustion chamber, and the air fuel ratio around the spark plug is substantially same as that in anywhere else in the combustion chamber. Therefore, the air fuel ratio can not be set lean enough to achieve such fuel economy benefit.

On the other hand, the direct injection spark ignited engine uses a high pressure injector, which injects fuel directly into its combustion chamber. The direct fuel injection can create stratified mixture of air and fuel within the combustion chamber particularly when the fuel is injected in a compression stroke of an engine cycle. The stratified air fuel mixture contains both fuel rich mixture, which has an air fuel ratio of the stoichiometry or richer than that, and fuel lean mixture. If the rich mixture is in the proximity of the spark plug when it makes a spark, the rich mixture can be ignited and start combustion. Then, flame propagates from the ignited rich mixture to the lean mixture and completes the combustion of the whole mixture. Therefore, an overall air fuel ratio of the stratified air fuel mixture can be set leaner than that of the homogeneous air fuel mixture.

As described above, to create the stratified air fuel mixture with sustainable ignitability, the rich mixture needs to be in the proximity of the spark plug, and the lean mixture needs to surround the rich mixture. A method to create the stratified air fuel mixture is presented in U.S. Pat. No. 6,892,695. The method uses a configuration of intake port and makes a swirl flow of air in the cylinder around the cylinder axis in an intake stroke. Then, it uses a recess formed on a top surface of a piston and maintains the swirl flow. In a later stage of a compression stroke, it injects fuel from a side mounted injector toward a center mounted ignition plug, and then the injected fuel impinges the swirl flow. Consequently, this method may create the stratified air fuel mixture with rich mixture in the proximity of the spark plug when the mixture is ignited at timing around the top dead center of the compression stroke.

Another method to create the stratified air fuel mixture is presented in Japanese Patent Application Publication JP2005-256630A. The method uses a side mounted multi-hole injector having six injection holes. From two of the injection holes, fuel is injected in the proximity of a center mounted spark plug. Fuel from the rest of the injection holes impinges a curved wall of a recess, which is formed on a top surface of the piston, when the injection timing is after the middle of compression stroke, and then the fuel is dispersed. Therefore, this method can create the properly stratified mixture as well.

The method presented in the '695 patent has the recess on the piston to maintain the swirl airflow, and the method presented in the JP2005-256630A has the recess on the piston to disperse the injected fuel to create the lean mixture. The above methods may improve the creation of the stratified air fuel mixture. However, considering that fuel spray is less likely to deflect its way and most likely to adhere to a surface when it impinges the surface at a right angle because the movement energy is fully converted to energy of adhesion then, the inventors herein have recognized that the injected fuel may adhere to the recess surface presented in the prior arts. When some fuel adheres to the wall, particularly if it is injected at a later stage of compression stroke, that fuel may not be evaporated enough because of insufficient time for the evaporation by the time of ignition. Eventually, it may create a wet spot on the surface. Air fuel mixture in the proximity of the wet spot is over-rich of fuel, and it may cause smoke in the exhaust due to lack of enough oxygen. Or, a part of the mixture may be self-ignited and cause knocking. Therefore, the inventors herein have realized need to improve the piston recess configuration to create properly stratified air fuel mixture within the combustion chamber.

SUMMARY

Accordingly, there is provided, in a first aspect of the present description, a direct injection spark ignition engine. The engine comprises a cylinder, a piston which is reciprocally movably arranged in the cylinder and defines with the cylinder a combustion chamber, a fuel injector arranged at one side of a center axis of the cylinder for directly injecting fuel into the combustion chamber, and a smoothly continuous lowered recess formed on a top surface of the piston surface for receiving at least part of fuel injected from the injector. The recess has a first cross section along a first plane including the cylinder center axis and a nozzle end of the injector. The first cross section has first and second lower contours substantially of arc shape with its center above the recess. The first and second lower contours are smoothly connected with each other through a lowest point of the first cross section. The first lower contour is located at the one side of the cylinder center axis. The second lower contour is located at the other side of the cylinder center axis. The first contour has a larger radius than a radius of the second contour.

In accordance with the injector arrangement of the engine, fuel may be injected from the one side of the cylinder axis to the other side, and it may impinge the recess surface. When the fuel is injected in a later stage of a compression stroke, it may impinge the recess surface at the one side of the cylinder axis which is closer to the injector. Also, the fuel may be injected from a multi-hole injector which makes a plurality of fuel sprays each flowing in a different radial direction, or the fuel spray itself may have a conical shape. In any events, an impinging angle between the fuel spray direction and the piston top plane is more obtuse as the impinging point is farther away from the cylinder axis. In accordance with the configuration of the first aspect, a first surface corresponding to the first contour ascends on the arc shaped contour, an angle between a tangent of the first contour and the piston top plane is more obtuse as the tangent is farther away from the cylinder axis, because the first contour is arc shaped with its center above the recess. It conforms to the characteristic of the fuel impinging angle. Therefore, the fuel impinging angle may be within a certain range wherever the fuel impinges of the first recess surface. Consequently, when the fuel spray impinges the first recess surface, it may modestly reduce its movement energy and deflect its direction without adhering to the recess surface.

Further in accordance with the configuration, a second surface of the recess surface corresponding to the second contour ascends with smaller radius than the first contour from the lowest point to the level of the piston top surface. Some of the fuel injected from the injector may directly impinge the second recess surface with a relatively obtuse angle. However, the directly impinging fuel has relatively small movement energy at the time of impingement due to the longer distance from the injector because the second recess surface is located at the opposite side to the injector with respect to the cylinder center axis. Also, some of the fuel which has reflected at the first surface may impinge the second surface for the second time, and has reduced its movement energy at the first impingement. Therefore, the fuel spray directed from the injector to the second surface may not adhere to it thanks to the reduced movement energy, rather may be guided upward by the second surface. The upward guided fuel spray may hit another fuel spray directed to the cylinder wall and prevent its adhesion to the cylinder wall in the same manner. Consequently, this configuration may properly guide the fuel spray, prevent the wet fuel spot anywhere within the combustion chamber, and create properly stratified air fuel mixture.

In a second aspect of the present description, the first recess cross section has first, second and third lower contours. The first lower contour is located at the one side of the cylinder center axis and modestly inclined. The second lower contour is located at the other side of the cylinder center axis and more steeply inclined than the first lower contour. The third contour connects between the first and second lower contours, and includes a lowest point of the first recess cross section and a substantially extending level portion which is perpendicular to the cylinder axis. According to the configuration of the second aspect, the first and second contours function as the first and second contours do in the first aspect. Therefore, the above configuration can create properly stratified air fuel mixture.

BRIEF DESCRIPTION OF THE DRAWINGS

The advantages described herein will be more fully understood by reading an example of embodiments in which the above aspects are used to advantage, referred to herein as the Detailed Description, with reference to the drawings wherein.

DETAILED DESCRIPTION

The embodiments of the present description will now be described with reference to the drawings, starting with FIG. 1, which shows an overview of an engine system of an internal combustion engine 20. In the embodiments, the engine 20 is onboard of an automotive vehicle and drives wheels of the vehicle through a drive-train including a transmission, as is well known in the art. The engine 20 is a four stroke, direct gasoline injection, spark ignition engine, although any other fuel, which can be ignited by a spark and injected directly into the combustion chamber, may be used, including ethanol, natural gas and hydrogen.

Figure 2:
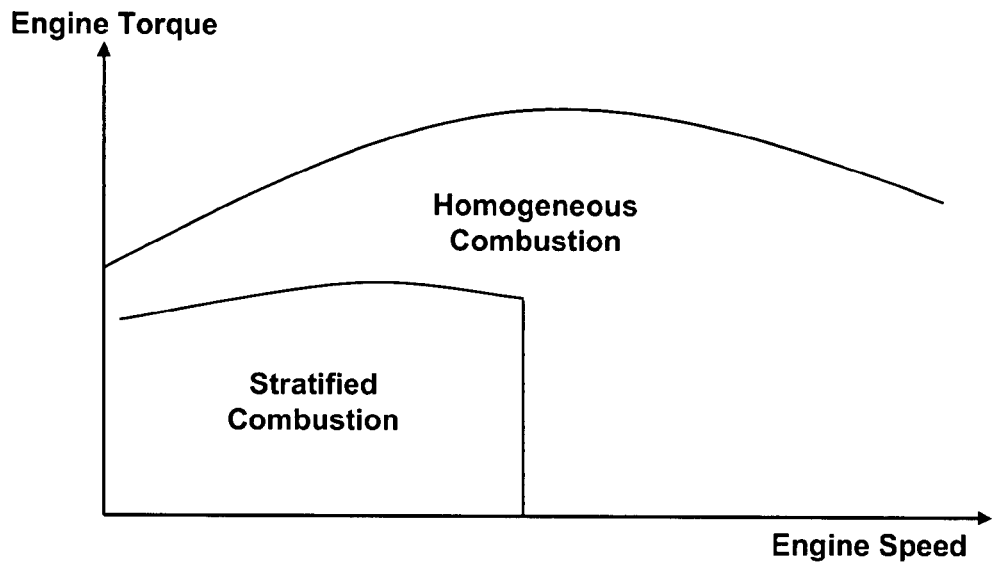
FIG. 2 is a operational mode map of an direct injection spark ignition engine according to the embodiments of the embodiment.

An engine control unit (ECU) 100 controls operation of the engine 20. The ECU 100 is a microprocessor based controller, which is comprised of a CPU, a ROM, a RAM, and others in a manner known in the art, and functionally comprises an operating condition determination section, a fuel control section, a swirl control section, and an ignition control section. The operating condition determination section is connected to various sensors not shown (for example, a crank angle sensor, an engine temperature sensor, an intake air pressure sensor, a throttle opening sensor, an accelerator sensor, a brake sensor, and others), and stores detected parameters for the computational use by the control sections. It also determines an operating mode of the engine 20 based on the detected engine parameters including an engine speed and a desired engine torque in accordance with a map as shown in FIG. 2. The operating mode includes a stratified combustion mode for relatively low speed and low torque conditions and a homogeneous combustion mode for relatively high speed and high torque conditions.

Figure 3:
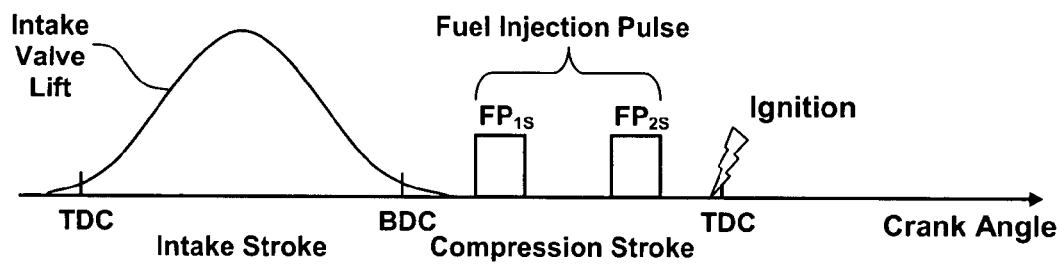
FIG. 3 is a timing chart of engine operations in a stratified combustion mode and a homogeneous combustion mode according to the embodiment.
Figure 3:
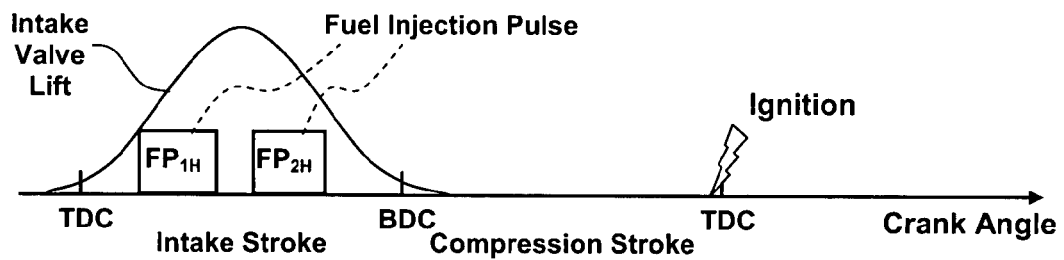

As shown in FIG. 3, in the stratified combustion mode, fuel is injected into the combustion chamber in a compression stroke of the four stroke engine cycle, so that the fuel is not evenly mixed with air and forms stratified air fuel mixture at the time of ignition which is usually just before a compression top dead center of the engine cycle due to lack of enough mixing time. On the other hand, in the homogeneous combustion mode, fuel is injected into the combustion chamber in an intake stroke, so that the fuel is evenly mixed with air and forms homogeneous air fuel mixture at the time of ignition because of a mixing effect of the intake airflow and enough mixing time.

The engine 20 comprises a cylinder block 22, and a cylinder head 23, which is arranged on the cylinder block 22. The cylinder block 22 and cylinder head 23 integrally form a plurality of cylinders 24. Although only one cylinder is illustrated in FIG. 1, any number of cylinder(s) may be formed within the respective combination of the cylinder block 22 and the cylinder head 23. The cylinder 24 accommodates a piston 26 which slides therein. As is well known in the art, the cylinder block 22 rotationally supports a crankshaft 21 using journals, bearings and the like. Further, a connecting rod 25 links the crankshaft 21 and the piston 26.

The cylinder head 23, the cylinder 24, and the piston 26 collectively form a combustion chamber 27 inside. A lower surface of the cylinder head 23, an inner surface or liner of the cylinder 24 and a top surface of the piston 27 respectively consist a ceiling, a side wall and a bottom of the combustion chamber 27. The ceiling of the combustion chamber 27 forms two inclined surfaces, which extend in the proximity to a lower end of the cylinder head 23, and is shaped to be a so-called pent-roof with its ridge line extending approximately in a direction of the crankshaft axis $X_{AC}$.

Figure 1:
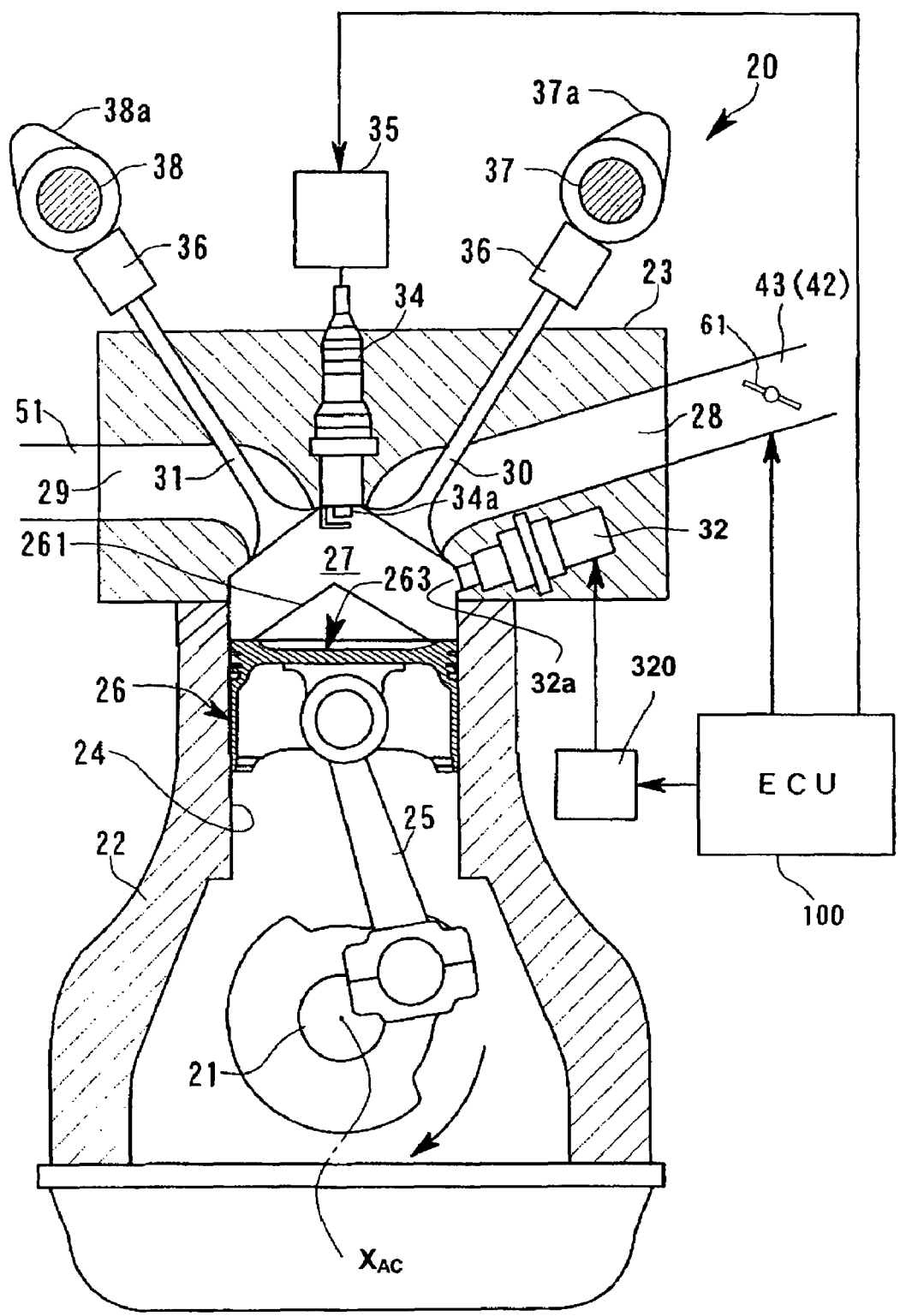
FIG. 1 is a schematic diagram of an engine system according to an embodiment of the present description.

Although only one is illustrated in FIG. 1, two intake ports 28 are formed in the cylinder head 23 substantially in parallel in the direction of the crankshaft axis $X_{AC}$, and respectively open to the combustion chamber 27 from one of the inclined ceiling surfaces. Likewise, two exhaust ports 29 are formed in the cylinder head 23 substantially in parallel in the direction of the crankshaft axis $X_{AC}$, and respectively open to the combustion chamber 27 from the other of the inclined ceiling surfaces. Intake valves 30 and exhaust valves 31 are respectively capable of shutting the intake ports 28 and the exhaust ports 29 from the combustion chamber 27 as shown in FIG. 1. The crankshaft 21 drives camshafts 37 and 38 through a known drive mechanism such as a chain. When the camshafts rotate, intake and exhaust cams 37a and 38a, which are affixed to the camshafts 37 and 38, respectively push the intake and exhaust valves 30 and 31 through tappets 36 to selectively open the intake and exhaust ports 28 and 29 on the four stroke engine cycle.

A spark plug 34 is mounted to the cylinder head 23 in the well known manner such as threading, and preferably is arranged on the ridge line of the combustion chamber ceiling. In the present embodiment, the ridge line is slightly offset from the cylinder center axis $Z_{AC}$ to left in FIG. 4 (exhaust side), due to larger size of the intake valves 30. An electrode 34a of the spark plug 34 faces the inside of the combustion chamber 27, and is capable of igniting air fuel mixture in the combustion chamber 27. An ignition circuit 35 receives a control signal from the ignition control section of the ECU 100, and provides electric current to the spark plug 34 so that it makes a spark at desired ignition timing.

A fuel injector 32 is mounted to the cylinder head 23 at one side of the cylinder center axis $Z_{AC}$ in a known manner such as using a mounting bracket. A nozzle end 321 of the injector 32 faces the inside of the combustion chamber 26 from a space vertically below and horizontally between the two intake ports 28. The injector 32 is of a multi-hole type and has six spray holes as described in greater detail below. A fuel supply system 320 includes a high pressure pump and an injector driver circuit not shown, and supplies fuel from a fuel tank not shown to the injector 32 with a fuel pressure of 12 MPa through 20 MPa depending on a control signal from the fuel control section of the ECU 100. Also, the fuel supply system 320, particularly the injector driver circuit, activates a solenoid of the injector 32 to open the spray holes in accordance with a control signal from the fuel control section of the ECU 100, in order to inject desired amount of fuel at desired timing.

The intake ports 28 connect in fluid communication to branch intake passages 43 of an intake manifold 42. Two branch intake passages 43 are provided for each of the cylinders 24, and form individual intake passages of equal length merging to a common surge tank for a plurality of cylinders. One of the two branch intake passages 43 for the each cylinder has a swirl control valve 61 capable of substantially closing the one branch intake pipe 43. An actuator not shown actuates the swirl control valve 61 in accordance with a control signal from the swirl control section of the ECU 100. When the swirl control valve 43 closes the one branch intake passage 43, intake airflows through the two intake ports 28 differ from each other, and cause a swirl motion of the air charge around the cylinder center axis $Z_{AC}$ in the combustion chamber 27.

The exhaust ports 29 connect to an exhaust passage 51 of an exhaust manifold, and eventually are in fluid communication with an exhaust pipe in a manner known in the art.

Figure 4:
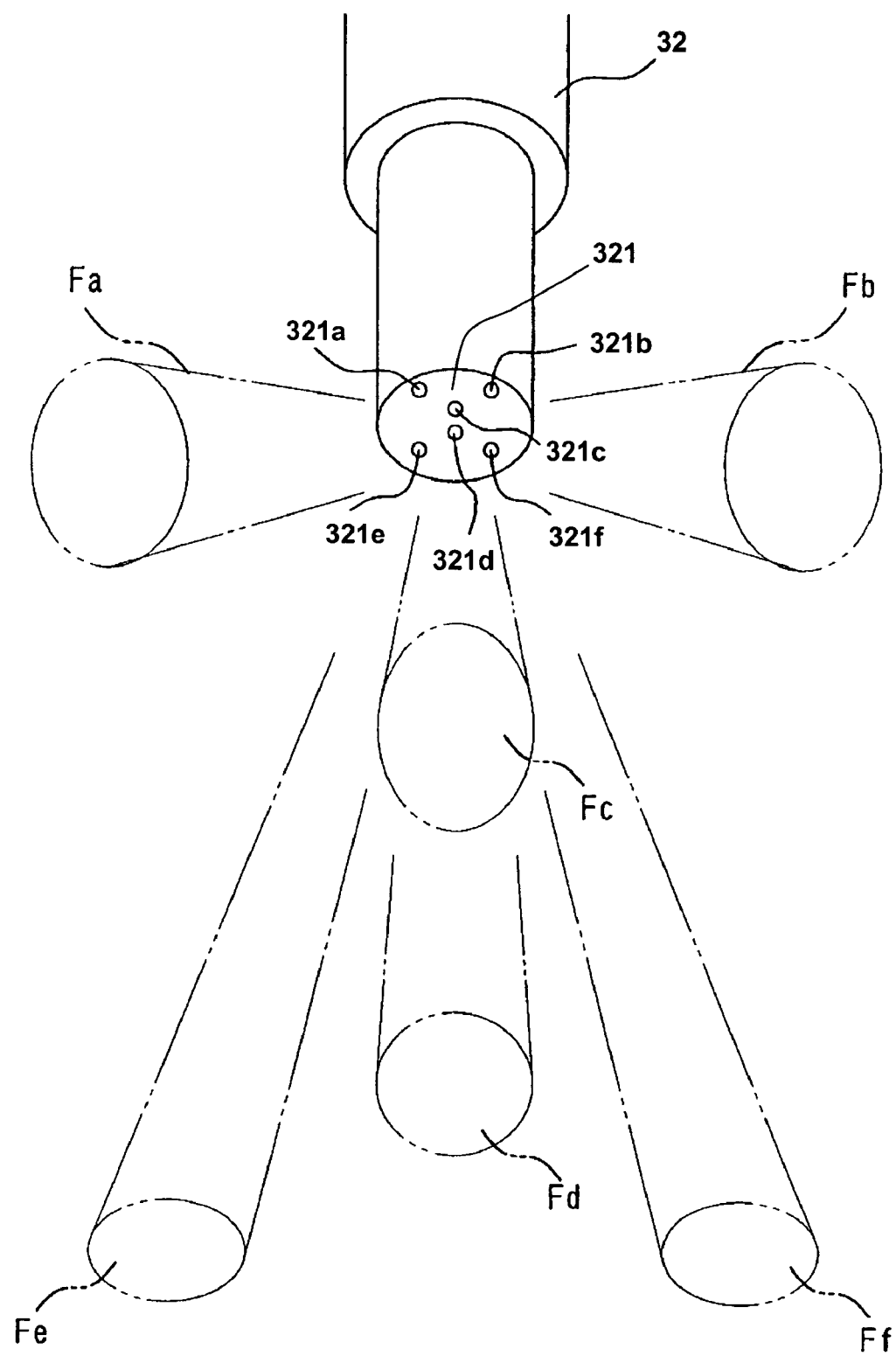
FIG. 4 is an explanatory diagram of fuel injection from a multi-hole type fuel injector according to the embodiment.

As shown in FIG. 4, the fuel injector 32 has at its nozzle end 321 six spray holes 321a through 321f respectively injecting fuel sprays $F_A$ through $F_F$ in cone shape. The fuel spray holes 321a and 321b are configured so that center axes of the fuel sprays Fa and Fb are directed to both horizontal sides of the electrode 34a of the spark plug 34 as shown in FIG. 4. The spray hole 321c is configured so that a center axis of the fuel spray Fc is directed to a point vertically just below the electrode 34a. The spray holes 321a through 321c are configured so that the fuel sprays from them are oriented in the proximity of the electrode 32a of the spark plug 32 which is arranged slightly off the cylinder center axis ZAC, and does not directly hit the electrode 32a. Therefore, when fuel is injected at or just before ignition timing as in the stratified combustion mode shown in FIG. 2, a spark generated at the electrode 34a may directly ignite the fuel sprays Fa through Fc.

Figure 8A:
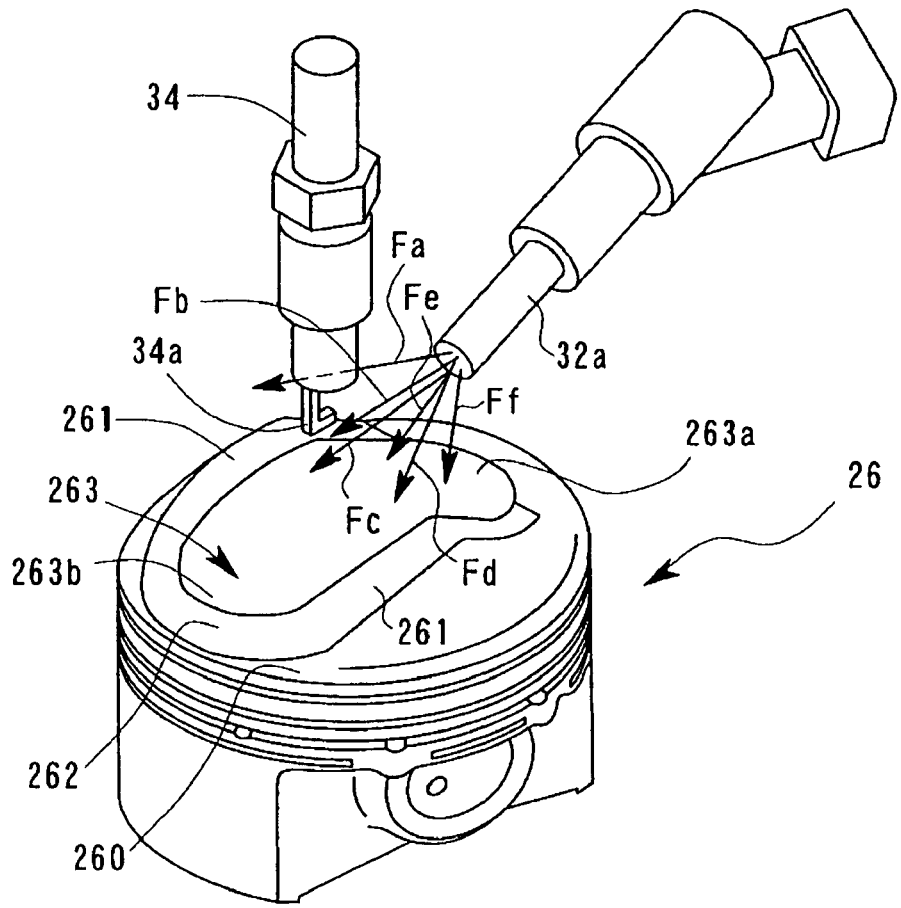
FIG. 8 is a perspective view (A) showing the piston positioned closer to its top dead center with fuel sprays, and a plane view (B) of the piston with fuel impinging points.

The spray holes 321d through 321f are configured so that center axes of the fuel sprays Fd through Ff may hit a recess 263 of the piston 26 if the piston is positioned relatively close to its top dead center at the fuel injection timing, as shown in FIG. 8. As described in greater detail below, when the fuel sprays Fd through Ff hit the recess 263, they deflect their stream directions, also mix more with air, and create leaner air fuel mixture compared to the fuel sprays Fa through Fc.

Figure 5A:
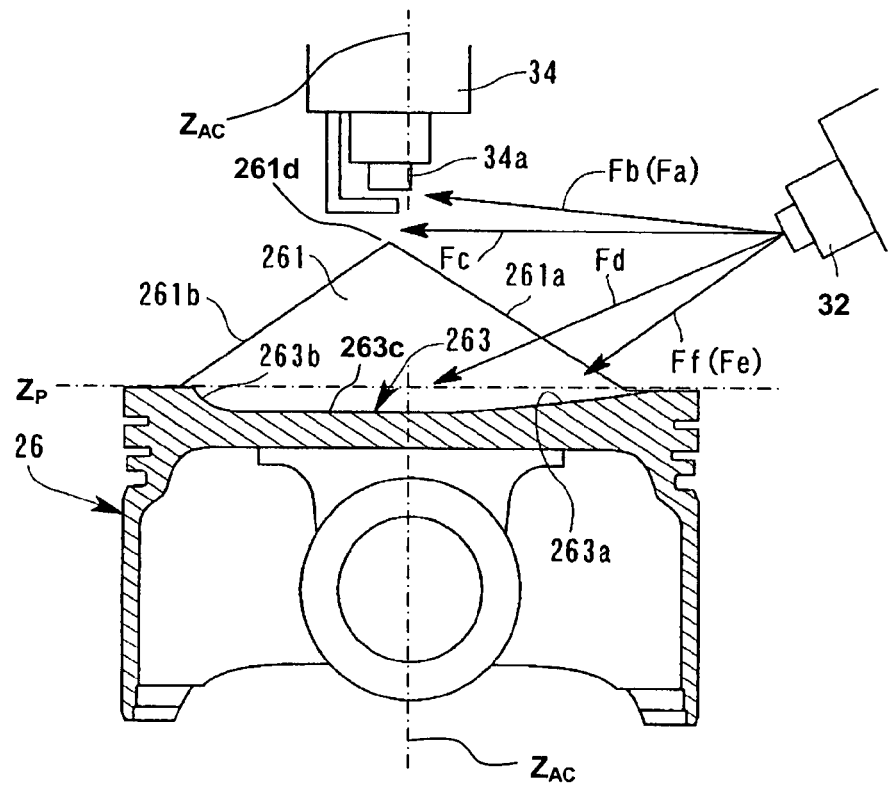
FIG. 5 shows a piston according to the embodiment, being a side sectional view (A), and a plane view (B)
Figure 5B:
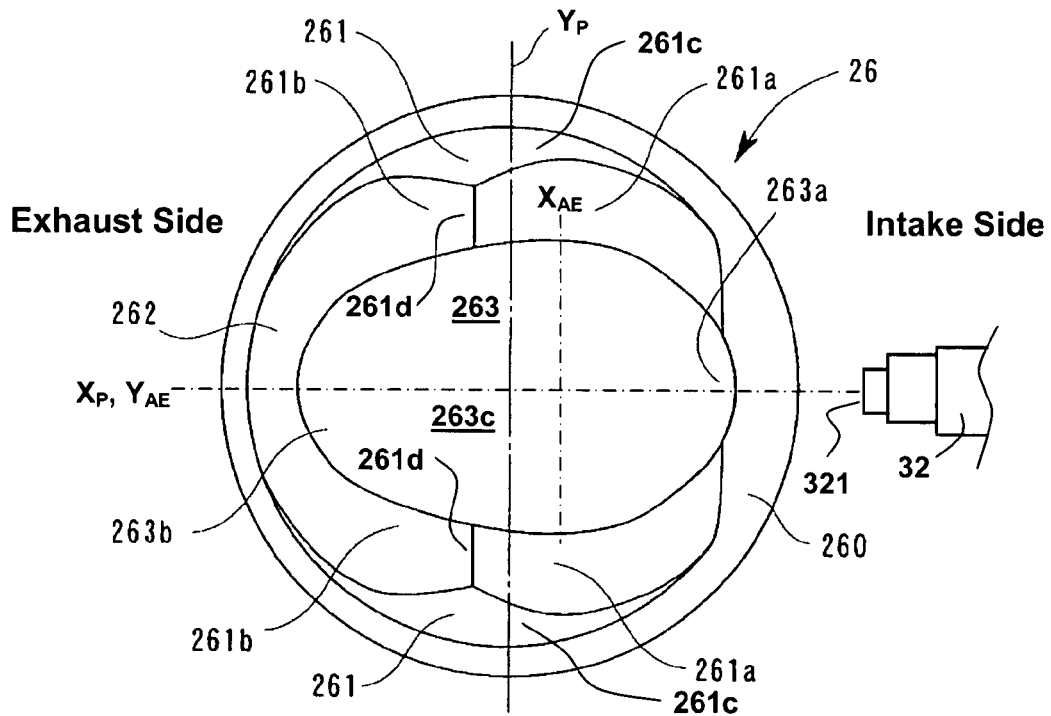

As shown in FIG. 5, specifically the top view (B) of the piston 26, a first imaginary plane $X_P$ includes the cylinder center axis $Z_{AC}$ and is normal to the crankshaft axis $X_{AC}$. The first plane $X_P$ intersects the nozzle end 321 of the injector 32 and, in this embodiment, includes a center axis of the injector 32, although it may not include the injector center axis depending on the arrangement or configuration of the injector 32. A second imaginary plane $Y_P$ includes the cylinder center axis $Z_{AC}$ and the crankshaft axis $X_{AC}$. At a right side of the second plane $Y_P$ in FIG. 5(B), the injector 32 is arranged, and the intake ports 28 is arranged as well. Therefore, the right side in FIG. 5 will be referred to as intake side, and the left side will be referred as exhaust side. A third imaginary plane $Z_P$ is arranged perpendicular to the first and second imaginary planes $X_P$ and $Y_P$, and defines a height of a nominal top surface or crown surface 260 of the piston 26 as shown in the side sectional view (A) of the piston 26.

At both sides of the first imaginary plane $X_P$, two ridges 261 are integrally formed with the piston 260 and arise from the third imaginary plane $Z_P$. The each ridge 261 has two inclined top surfaces 261a and 261b, an inclined side surface 261c and a ridge peak 261d. The inclined top surface 261a descends from the peak 261d to the intake side, and ends at the piston crown surface 260. The both inclined top surfaces 261b descend from the peaks 261d to the exhaust side, and connect to each other at a connecting wall 262, thereby forming a U letter shape in plane view. The ridges 261 and the connecting wall 262 generally conform to the pent-roof shape of ceiling of the combustion chamber 27 formed by the cylinder head 23, so that a small gap is left there between the piston 26 and the cylinder head 23 when the piston 26 is at its top dead center.

Figure 7:
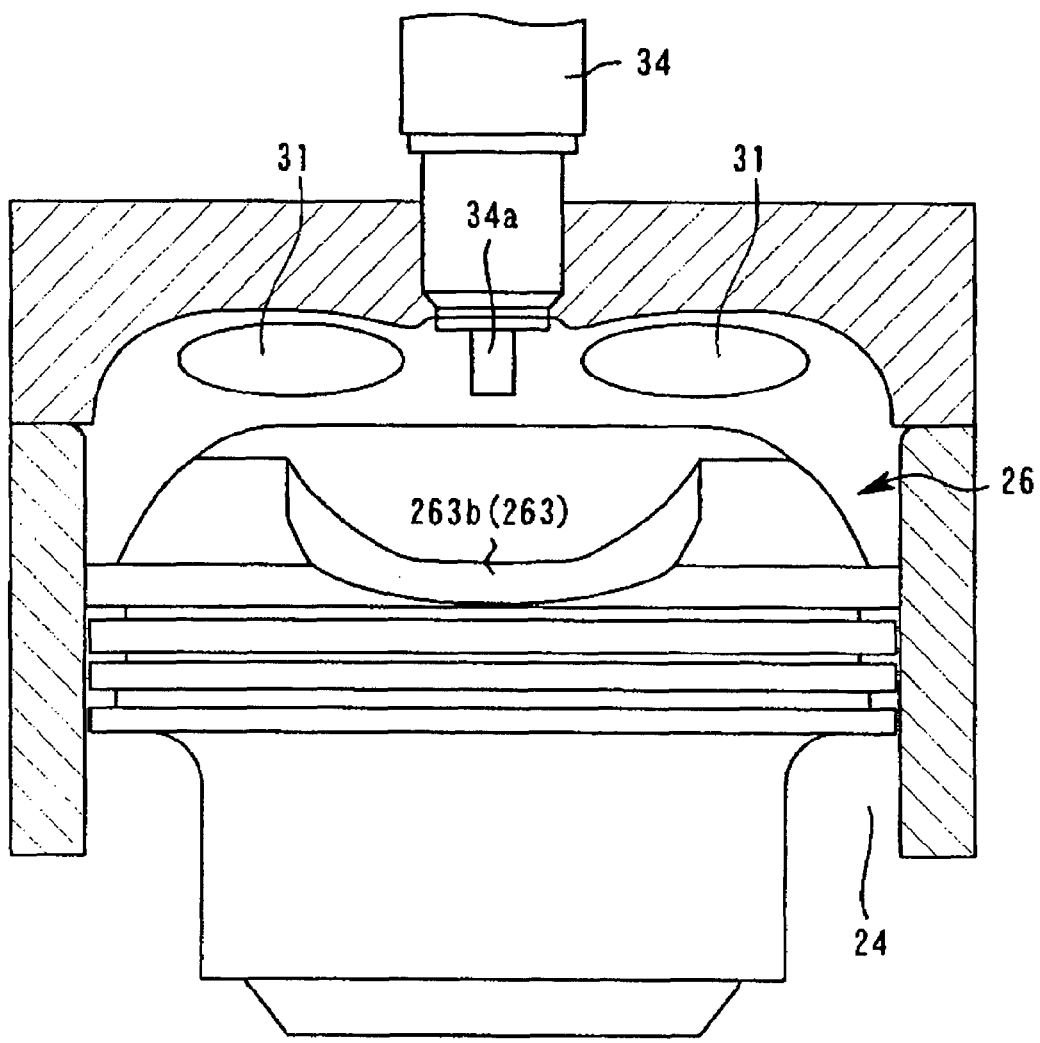
FIG. 7 is a side view of the piston through the cutout cylinder.

At the inner side of the ridges 261 and the connecting wall 262 of the piston 26, a lowered recess 263 is formed continuously with the ridges 261 as shown in FIG. 7. In plane view, as shown in FIG. 5(B), the recess 263 is formed to be an egg shape or generally a combination of two half ellipses. The half ellipse shown at the intake side in FIG. 5(B) is referred to as first ellipse, and that at the exhaust side is as second ellipse. In the illustrated embodiment, although the first ellipse is almost a circle, the first and second half ellipses have a common major axis $Y_{AE}$ on the first imaginary plane $X_P$, and they have a common minor axis $X_{AE}$ extending in parallel to the second imaginary plane $Y_P$. The common minor axis $X_{AE}$ is offset to the intake side, and defines the biggest width of the ellipses. Therefore, the recess area of the half eclipse is greater at the exhaust side.

Figure 6A:
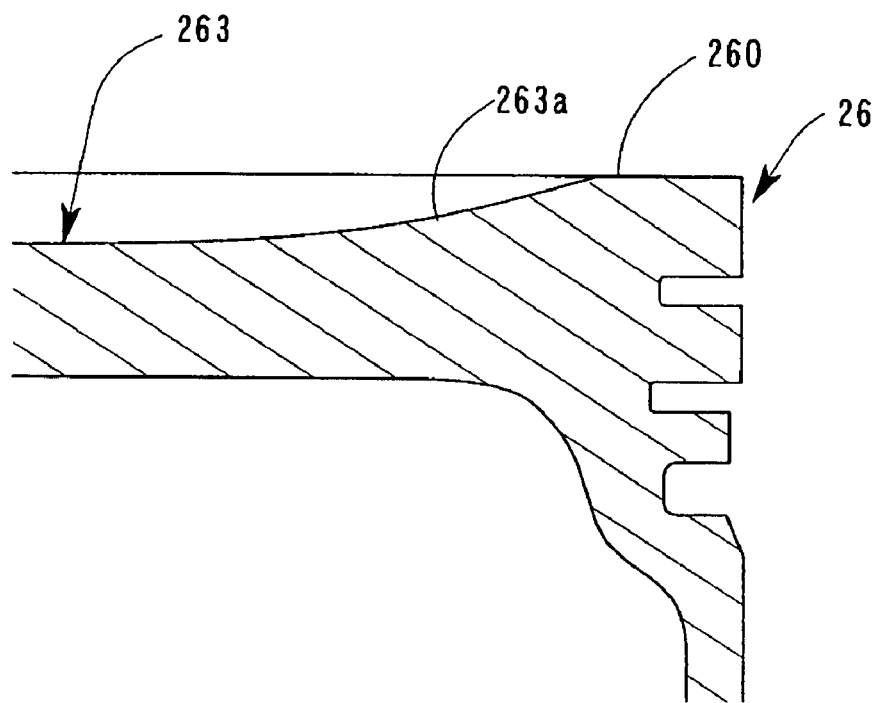
FIG. 6 shows enlarged side sectional views of the piston on a first imaginary plane $X_P$ of FIG. 5 at an intake side (A) and an exhaust side (B)
Figure 6B:
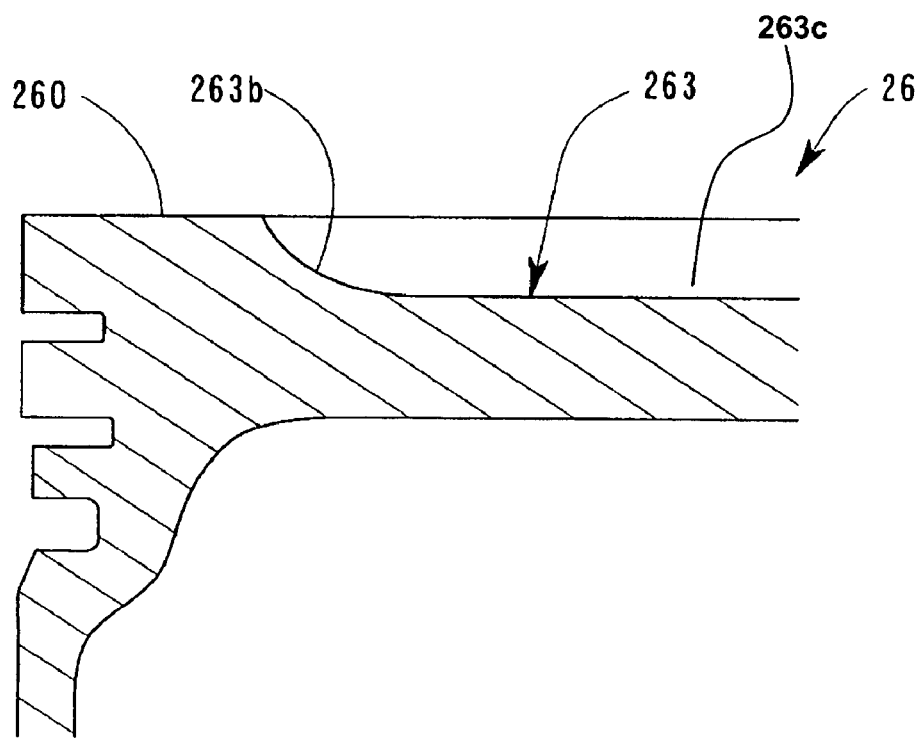

A surface of the recess 263 has three sections 263a through 263c, which are smoothly continuous within themselves and with each other. FIG. 5(A) shows a vertical sectional view on the first imaginary plane $X_P$, FIG. 6(A) shows more detailed sectional view on the first imaginary plane $X_P$ at the intake side, and FIG. 6(B) shows that at the exhaust side. From these figures, the three sections 263a through 263c of the recess surface can be seen to be continuous with each other. FIG. 7 shows a view of the recess surface from the intake side through the cylinder cutout, from which the recess surface can be seen to be smoothly continuous by itself and to end at the top surfaces of the ridges 261.

As shown in FIG. 5(A) and FIG. 6(A) for more detail, the intake side section 263a of the recess 263 has a surface cross section on the first imaginary plane $X_P$. The surface cross section or a lower contour of the recess 263 descends from the crown surface 260 to the center section 263c preferably at a point less than one eighths of the cylinder diameter from the piston periphery, and forms a substantially arc shaped contour with its imaginary center positioned above the recess 263. Likewise, as shown in FIG. 5(B), the exhaust side section 263b has a surface cross section on the first imaginary plane $X_P$. The surface cross section descends from the connecting wall 262, at a point, preferably less than a quarter, more preferably less than one eighths of the cylinder diameter from the periphery of the piston 26, to the center section 263c, and forms a substantially arc shaped contour with its imaginary center positioned above the recess 263. As seen from FIG. 5(A), the center section 263c smoothly connects between the intake side section 263a and the exhaust side section 263b. The surface cross section at the center section 263c extends horizontally below and substantially in parallel to the third imaginary plane $Z_p$, and includes the lowest point of the lowered recess 263.

The imaginary center of the arc shaped contour at the exhaust side section 263b is positioned vertically above the imaginary arc center at the intake side section 263a. In other words, the arc curvature of the exhaust side section 263b is greater than that of the intake side section 263a, or the arc radius at the intake side section 263a is greater than that of the exhaust side section 263b. Therefore, the surface cross section or contour on the first imaginary plane $X_P$ at the exhaust side section 261b has a more steep inclination than at the intake side section 263a.

According to the configuration of the piston 26 described above, the pair of ridges 261 and the connecting wall 262 conform the ceiling surface of the combustion chamber 27, and they can increase a compression ratio of the engine, thereby improving the engine efficiency.

Figure 8B:
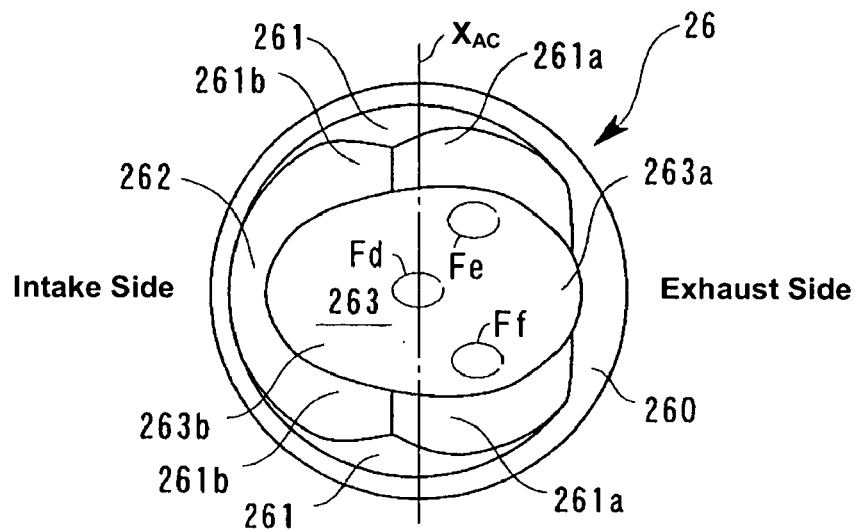
Figure 9A:
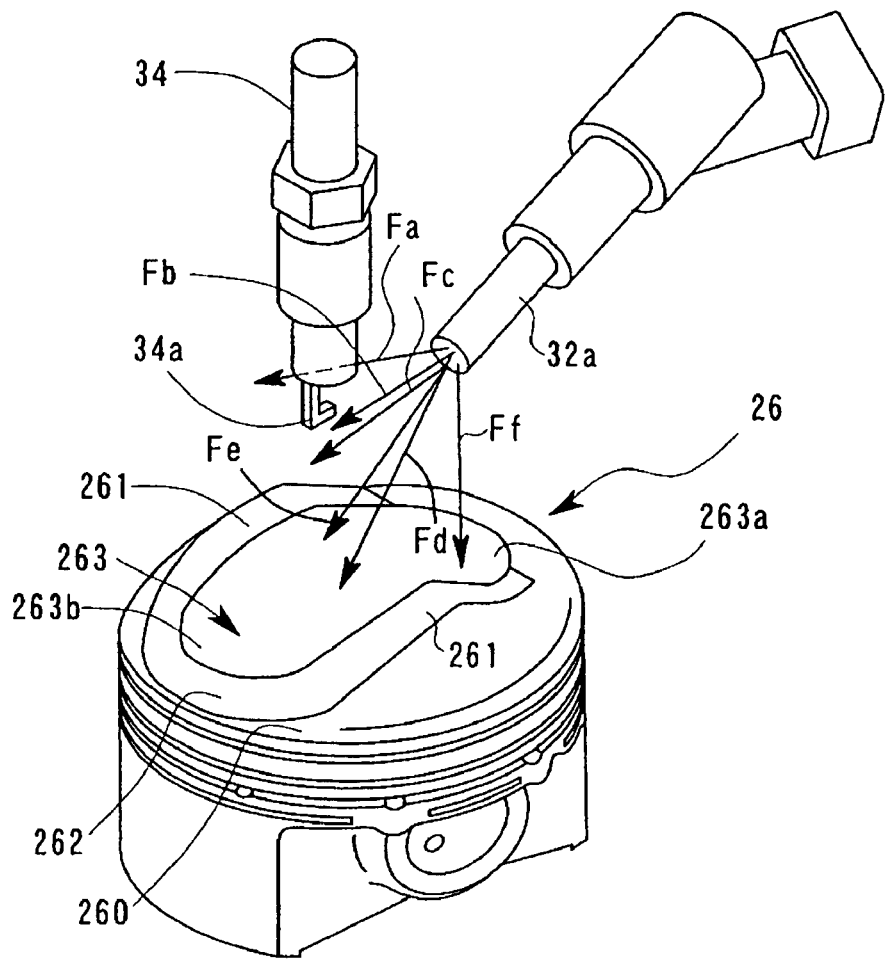
FIG. 9 is a perspective view (A) showing the piston positioned closer to its bottom dead center with fuel sprays, and a plane view (B) of the piston.
Figure 9B:
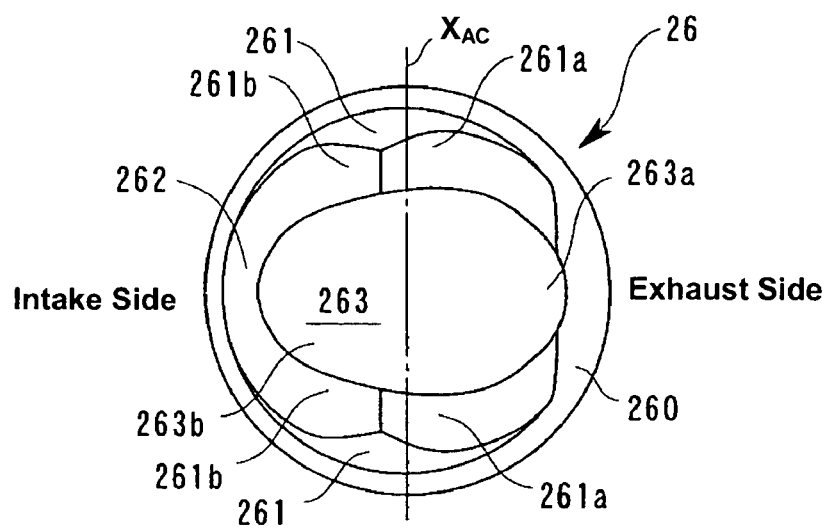

The intake side section 263a of the recess 263 has the arc shaped surface cross section in a major direction of fuel stream from the injector 32, and the center section 263c has the flat surface section in that direction. Therefore, a grade of the surface cross section of the recess 263 with respect to the horizontal third imaginary plane $Z_P$ decreases from the intake side toward the center section 263c where it is zero. In other words, the surface cross section of the recess 263 makes an acuter angle with the horizontal plane $Z_P$ as it is farther away from the intake side. As can be seen from FIG. 5(A) and FIG. 8, a moving direction of the fuel spray Fd makes an acuter angle with the horizontal plane $Z_P$ than that of the fuel sprays Fe and Ff does. In other words, the angle is acuter as a fuel spray is away from the injector 26 at the intake side. As such, the change of grade of the recess surface cross section corresponds to the change of the moving direction of fuel spray. When the fuel sprays Fd through Ff impinge the recess 263, as shown in FIG. 8(b), the impinging angle may be regulated within a certain range of acute angles. The movement energy of the fuel spray is relatively evenly attenuated by the impingement at the regulated impinging angle. If, in an extreme case, the fuel spray impinge the surface at a right angle, and the movement energy is fully absorbed, the fuel may adhere to the recess surface and create a wet spot. But, in this case, the movement energy is relatively evenly reduced thanks to the regulated impinging angle, and the fuel spray is properly reflected to the exhaust side.

The reflected fuel spray goes to the exhaust side, some of which impinges the exhaust side section 263b of the recess 263, when it goes nearly horizontally. The exhaust side section 263b has the arc shaped surface cross section in the major direction of the fuel spray. This surface cross section has the smaller arc radius and the steeper grade than at the intake side. Therefore, the exhaust side section 263b may reflect or guide an impinging fuel spray substantially upwardly. Some of the fuel spray previously reflected may impinge the exhaust side section 263b at an angle closer to a right angle. Even if so, the movement energy of the fuel spray is substantially attenuated by the previous reflection, and the fuel spray may not adhere nor create the wet spot, but may stay there and mix with the air. Further, some of the fuel spray injected from the injector 32 may directly impinge the exhaust side section 263b. Even if so, since the distance from the injector 32 is greater because the exhaust side section 263b is positioned more than a quarter of the cylinder diameter from the cylinder axis $Z_{AC}$, the movement energy of the fuel spray is attenuated on its way to the exhaust side section 263b, and the fuel adhesion may not take place.

The lowered recess 263 is surrounded by the pair of ridges 261 and the connecting wall 262 at the exhaust side. At most part of the recess 263, a surface cross section on a plane in parallel to the second imaginary plane $Y_P$ forms a smoothly continuous contour with the ridges 263, as shown in FIG. 7. The fuel sprays Fd through Ff injected from the spray holes 32D through 32F of the fuel injector 32 may reflect at the surface horizontally inward of the recess 263. Therefore, the ridge and recess configuration may prevent any fuel spray having greater movement energy from directly hitting the cylinder wall, thereby preventing the fuel from diluting engine oil on the cylinder wall.

Further, as shown in FIG. 1, the swirl control valve 61 is arranged in one of the intake passages 43. When the swirl control valve 61 is closed, intake air flows, in an intake stroke of the engine cycle, into the combustion chamber only from one of the intake ports 28 which is offset from the cylinder center axis, and the offset airflow causes a swirl motion of the intake air. On the piston 26, as shown in FIG.

5(B), the exhaust side section 263b of the recess 263 forms a curved wall continuously with the other sections of the recess 263 and the ridges 261. The wall at the exhaust side is deepest and positioned at the opposite side to the intake ports 28. Its curvature rate is greatest because it is at the end of the major axis $Y_{AE}$ of the half ellipse. Therefore, the swirl motion is smoothly guided by the wall and maintained after the intake stroke, in other words, in the succeeding compression stroke. When fuel is injected in the compression stroke, the air swirl motion keeps movement energy of fuel spray that is reflected at the recess 263, and disperses the fuel in the air, thereby evaporating and atomizing the fuel and creating well mixed air fuel mixture. Also, the air swirl motion may guide the air fuel mixture around the spark plug 34, thereby creating stratified charge with relatively rich mixture around the spark plug 34 and gradually leaner mixture away.

As shown in FIG. 3, the fuel control section of the ECU 100 controls the fuel supply system 320 to inject fuel through the fuel injector 32 to the combustion chamber in a compression stroke when the engine is in the stratified combustion mode shown in FIG. 2. On the other hand, the fuel is injected in an intake stroke when the engine is in the homogeneous combustion mode. In the stratified combustion mode, at its relatively higher torque side, fuel injection is split into two discrete first and second fuel pulses $FP_{1S}$ and $FP_{2S}$, while at its lower torque side, fuel injection is only the latter second fuel pulse $FP_{2S}$ because relatively small amount of fuel is required.

As shown in FIG. 3, the first fuel pulse $FP_{1S}$ injects fuel sprays Fa through Ff when the piston 26 is positioned relatively lower. Some of the fuel may directly hit the piston 26 or the cylinder wall, but the distance from the injector 32 is relatively great, and the movement energy of the fuel spray may be attenuated enough, thereby preventing the fuel adhesion. Also the fuel stays for relatively long period before ignition timing, and may be evaporated by then.

On the other hand, as shown in FIG. 3, the second fuel pulse $FP_{2S}$ injects fuel sprays Fa through Ff when the piston 26 is positioned relatively close to the cylinder head 23 or the injector 32. As described above, even though the fuel sprays Fd through Ff impinge the piston 26, the recess 263 may properly reflect the fuel sprays and guide them in the combustion chamber 27, thereby preventing the fuel from landing somewhere or keeping it in the air until the ignition. Further, the fuel injector has six injection openings, and then each fuel spray from the injection opening has lesser mass. Also, the fuel injection pulse is divided into two $FP_{1S}$ and $FP_{2S}$. Therefore, the individual fuel spray has less movement energy right when injected from the injector 26. Even if the fuel sprays Fa through Fc impinge any wall of the combustion chamber, such as a cylinder head surface, after passing the proximity of the spark plug 34, it is not likely to adhere to the wall.

Additionally, by closing the swirl control valve 61, the swirl air motion is generated, and the ridges 261 and the recess 263 of the piston 26 maintains the swirl motion at the timing of the second injection pulse $FP_{2S}$. Therefore, the air swirl motion may further prevent the fuel adhesion and make more robust stratification of air fuel mixture.

In the homogeneous combustion mode shown in FIG. 2, at its relatively higher torque side, fuel injection is split into two discrete first and second fuel pulses $FP_{1H}$ and $FP_{2H}$, while at its lower torque side, fuel injection is only the latter second fuel pulse $FP_{2H}$ because relatively small amount of fuel is required. The first fuel pulse $FP_{1H}$ injects fuel when the piston is positioned closer to the cylinder head 23 or the injector 32. The advantage of the stratified second pulse $FP_{2S}$ also applies for the homogeneous mode. Further, in the homogeneous combustion mode, the fuel is injected in an intake stroke, and therefore more air motion facilitates further evaporation and atomization of fuel. For the second fuel pulse $FP_{2H}$, the same advantage may be obtained as for the stratified first pulse $FP_{1S}$ in addition to the benefit of fuel injection in intake stroke.

As described above, the present embodiment has the recess 263 of the piston 26 and the multi-hole type injector, so that it may achieve more robust stratification of air fuel mixture and more secure evaporation and atomization of fuel.

It is needless to say that the invention is not limited to the illustrated embodiments and that various improvements and alternative designs are possible without departing from the substance of the invention as claimed in the attached claims.

For example, the recess 263 is preferred to be the above described egg shaped or combination of two half ellipses which is symmetric on the crankshaft axis $X_{AC}$, but it is not limited to that shape, and it may be shaped, for example, asymmetric on the axis $X_{AC}$, in other words, substantially a combination of four quarter ellipses, as long as its surface is smoothly continuous and the ellipse axis $X_{AE}$ is offset to the intake side. Also, although, in the above embodiment, the major ellipse axis $Y_{AE}$ is on the first imaginary plane $X_P$ which crosses the nozzle end of the injector 32, they may be offset from each other depending on the injection hole configuration and other consideration.

Although the intake side section 263a and the exhaust side section 263b of the recess 263 have the arc shaped cross sections on the first imaginary plane $X_P$, either one of the cross sections may be straight as long as the grade at the exhaust side is greater than the intake side.

The invention claimed is:

1. A direct injection spark ignition engine comprising:
    a cylinder;
    a piston which is reciprocally movably arranged in said cylinder and defines with said cylinder a combustion chamber;
    a fuel injector arranged at one side of a center axis of said cylinder for directly injecting fuel into said combustion chamber; and
    a smoothly continuous lowered recess formed on a top surface of said piston capable of receiving at least part of fuel injected from said injector, said recess having a first cross section along a first plane including said cylinder center axis and a nozzle end of said injector, said first recess cross section having first and second lower contours substantially of arc shape with its center above said recess, said first and second contours being smoothly connected through a lowest point of said first recess cross section, said first lower contour being located at said one side of said cylinder center axis, said second lower contour being located at the other side of said cylinder center axis, and said first contour having a larger radius than a radius of said second contour.

2. The direct injection spark ignition engine, as described in claim 1, wherein the deepest point of said recess in said first plane is located at said other side of said cylinder axis.

3. The direct injection spark ignition engine, as described in claim 2, further comprising:
    a spark plug arranged so that its electrode located in a proximity of said cylinder center axis.

4. The direct injection spark ignition engine, as described in claim 3, wherein said injector comprises at least two spray holes, through which fuel is injected into said combustion chamber, and wherein fuel injected from one of said spray holes is oriented to the proximity of said spark plug.

5. The direct injection spark ignition engine, as described in claim 4, wherein said spray holes inject first and second fuel sprays impinging on said piston top surface within said recess at first and second impinging points respectively at least in a later stage of a compression stroke, and said first impinging point being located closer to said fuel injector than said second impinging point along said first plane.

6. The direct injection spark ignition engine, as described in claim 1, wherein said recess has a second cross section along a second plane in parallel to said cylinder axis and perpendicular to said first plane, said second recess cross section having a third lower contour of upwardly opening arc shape with its lowest point at its center part.

7. The direct injection spark ignition engine, as described in claim 6, further comprising a pair of ridges which integrally arise from said piston top surface at both sides of said recess and said first plane.

8. The direct injection spark ignition engine, as described in claim 7, further comprising a top wall of said combustion chamber which partly conforms upper surfaces of said ridges.

9. The direct injection spark ignition engine, as described in claim 1, wherein said recess has, in a view from the top of the combustion chamber, generally combined shapes of first and second half ellipses in that an axis of said first half ellipse coincides with a minor axis of said second half ellipse, said axis of said first ellipse being located at said one side of said cylinder center axis.

10. The direct injection spark ignition engine as described in claim 9, further comprising an intake valve located at said one side of said cylinder axis.

11. The direct injection spark ignition engine as described in claim 10, wherein said intake valve is offset from said first plane.

12. The direct injection spark ignition engine as described in claim 11, further comprising a second intake valve, and a swirl control valve which is arranged in a passage in a fluid communication with said combustion chamber through said second intake valve, and is capable of closing said passage.

13. The direct injection spark ignition engine as described in claim 10, further comprising a pair of ridges integrally which arise from said piston top surface at both sides of said recess at both sides of said first plane.

14. The direct injection spark ignition engine, as described in claim 7, further comprising a top wall of said combustion chamber which partly conforms upper surfaces of said ridges.

15. A direct injection spark ignition engine comprising:
a cylinder;
a piston which is reciprocally movably arranged in said cylinder and defines with said cylinder a combustion chamber;
a fuel injector arranged at one side of a center axis of said cylinder for directly injecting fuel into said combustion chamber; and
a smoothly continuous lowered recess formed on a top surface of said piston capable of receiving at least part of fuel injected from said injector, said recess having a first cross section along a first plane including said cylinder center axis and a nozzle end of said injector, said first recess cross section having first, second and third lower contours, said first lower contour being located at said one side of said cylinder center axis and modestly inclined, said second lower contour being located at the other side of said cylinder center axis and more steeply inclined than said first lower contour, and said third contour connecting between said first and second lower contours, being less inclined than said fourth contour, and including a lowest point of said first recess cross section and substantially extending level portion.

16. The direct injection spark ignition engine, as described in claim 15, wherein said fuel injector comprises a spray hole through which fuel is injected and impinges said piston top surface within an area including said first lower contour at least in a later stage of a compression stroke.

17. The direct injection spark ignition engine, as described in claim 15, further comprising a pair of ridges which arise integrally from said piston top surface at both sides of said recess and said first plane.

18. A method of operating a direct injection spark ignition engine, comprising:
injecting first fuel from a fuel injector; and
injecting second fuel from said fuel injector after an interval after said first fuel so that a part of said second fuel impinges a lowered recess formed on a top surface of a piston, said recess having a first cross section along a first plane including a cylinder center axis and a nozzle end of said injector, said first recess cross section having first and second lower contours substantially of upwardly opening arc shape, said first lower contour being located at said one side of said cylinder center axis, said second lower contour being located at the other side of said cylinder center axis, and said first contour having a larger radius than a radius of said second contour.

19. The method as described in claim 18, wherein a part of said second fuel injection is oriented to the proximity of a spark plug.

20. The method as described in claim 18, wherein said second fuel injection takes place in a later stage of a compression stroke.

* * * * *